June 29, 1937.    L. W. GREVE    2,085,651
SUPPORTING FRAME FOR ROCK DRILLS
Filed Jan. 2, 1936    2 Sheets-Sheet 1
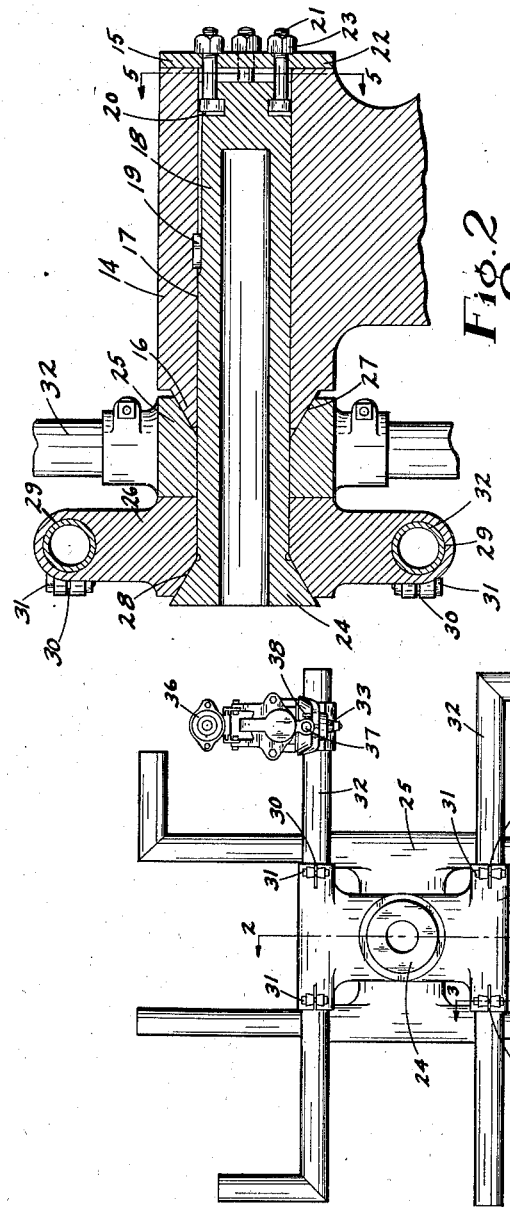
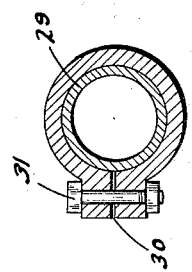
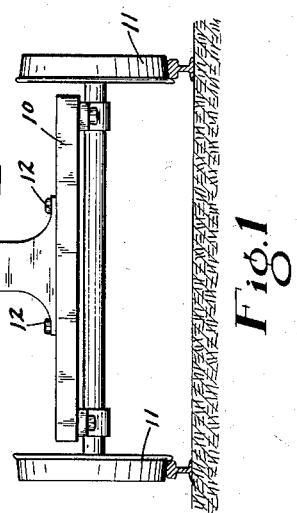
LOUIS W. GREVE
INVENTOR
BY
ATTORNEY June 29, 1937.  L. W. GREVE  2,085,651
SUPPORTING FRAME FOR ROCK DRILLS
Filed Jan. 2, 1936  2 Sheets-Sheet 2
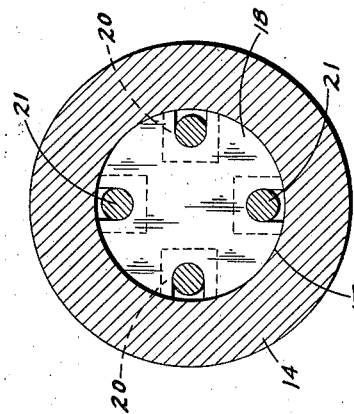
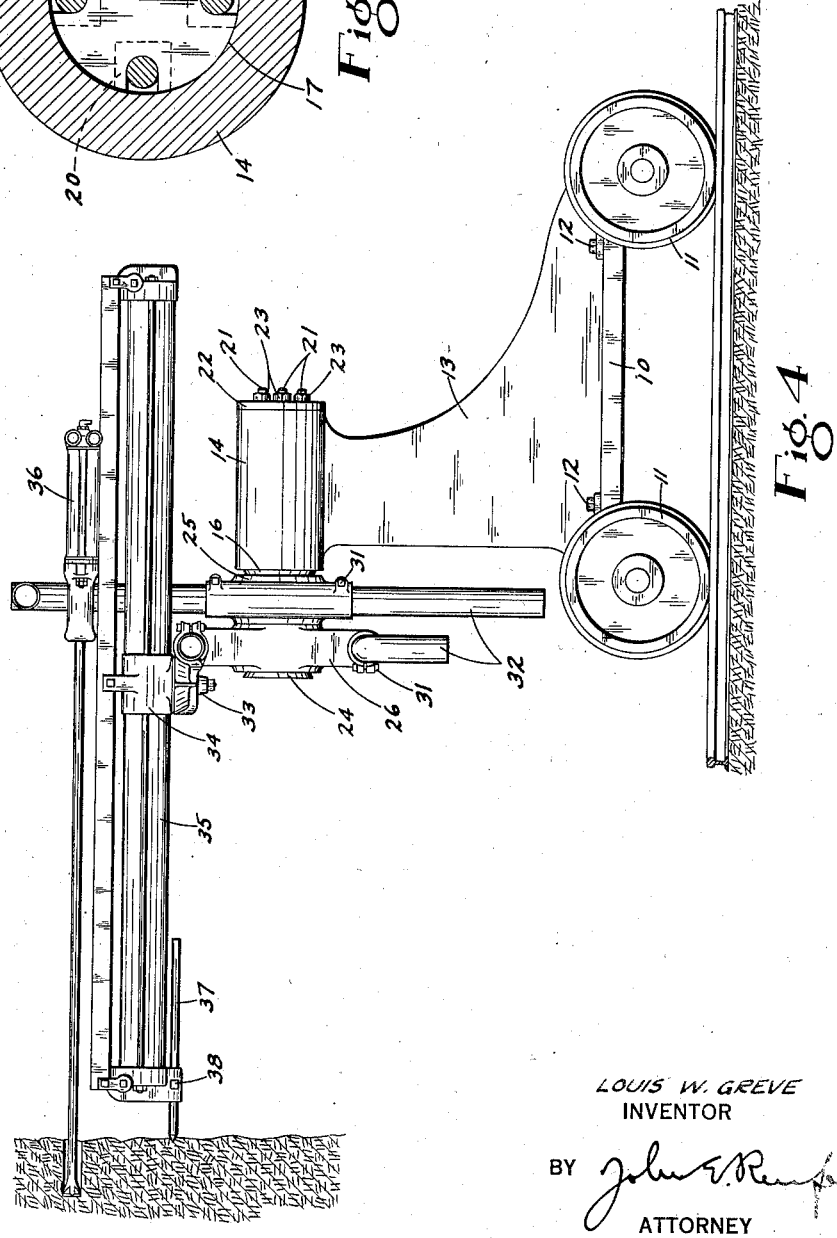
LOUIS W. GREVE
INVENTOR
BY
ATTORNEY Patented June 29, 1937

2,085,651

UNITED STATES PATENT OFFICE 2,085,651

SUPPORTING FRAME FOR ROCK DRILLS

Louis W. Greve, Cleveland, Ohio, assignor to The Cleveland Rock Drill Company, Cleveland, Ohio, a corporation of Ohio Application January 2, 1936, Serial No. 57,151

7 Claims. (Cl. 255—51)

This invention relates broadly to rock drills, but more particularly to a movable frame or carriage for rock drills of the drifter type.

One object of this invention is to produce a rock drill supporting frame especially designed for tunneling work, and therefore well suitable for mining purposes.

Another object of this invention is to produce a rock drill supporting frame adapted to carry a plurality of rock drills in a manner constituting a drilling apparatus of simple construction which is strong, durable, and efficient.

Other objects and advantages more or less ancilliary to the foregoing reside in the specific construction and aggroupment of the elements peculiar to this structure, as will become apparent from a more complete examination of this specification.

In the drawings:

Fig. 1 is a front elevational view of a drilling apparatus having the invention applied thereto.

Fig. 2 is an enlarged longitudinal sectional view taken in a plane indicated by line 2—2 in Fig. 1.

Fig. 3 is an enlarged cross sectional view taken in a plane indicated by line 3—3 in Fig. 1.

Fig. 4 is a side elevational view of the drilling apparatus shown in Fig. 1.

Fig. 5 is an enlarged cross sectional view taken in a plane indicated by line 5—5 in Fig. 1.

Referring to the drawings in which similar symbols indicate corresponding parts throughout the several views, 10 represents the base of the carrying frame, having suitable wheels 11 rotatably carried thereby. To the base 11 is rigidly secured by bolts 12, an upright 13 preferably formed of rectangular cross section and terminated by a longitudinally disposed enlargement or head 14. The rear face of the head 14 is machined vertically as at 15, while the front face thereof constitutes an outwardly tapered portion or cone 16. The head 14 is provided with a longitudinally disposed bore 17 extending therethrough, within which is slidably mounted a shaft or collet 18 locked therein against rotation by a key 19. The end portion of the shaft 18 adjacent the end 15 of the head 14, has rectangular cavities 20 radially cut therein, each cavity being adapted to receive the head of a bolt 21 which extends through a plate 22 for receiving a nut 23. The other end of the shaft 18 is terminated by an enlarged inwardly tapered head 24.

Rotatably mounted on the shaft 18 between its head 24 and the cone 16 of the head 14, there are two H shaped housings or turrets 25 and 26, the former being provided with an inwardly tapered counterbore 27 engaging the cone 16, while the latter has a similar counterbore 28 engaging the tapered head 24 of the shaft 18. Each of said housings has two parallel bores 29 formed therethrough in transversal and equidistant relation with the shaft 18. The wall of the housings 25 and 26 adjacent each end of the bores 29 is slotted as at 30 and shaped to receive a cross bolt 31. Slidably and rotatably mounted within each bore 29, there is an L shaped bar 32, which may be clamped therein by the bolts 31. To each of the bars 32, may detachably be secured by a clamp 33, one or more drilling apparatus 34, which includes a drill guiding frame 35 having a drill 36 slidable therein. Within the drill guiding frame 35, there is the usual feeding mechanism (not shown) connected to the drill for imparting slidable movement thereto in both directions. Slidably mounted within the forward end of the drill guiding frame 35, there is a setting peg 37, which may be locked against movement by a screw 38.

From the foregoing, it will be understood that due to the slidable movement of the bars 32 within the housings 25 and 26, as well as the rotary movement of these two housings on the shaft 18, the drilling motors carried by the bars 32 may be moved in any desired position. When it is desired to lock the bars 32 to the housing 25 or 26, it is only necessary to tighten the bolt or clamps 31. When the housings 25 and 26 have been rotated to bring the bars 32 in the desired position, the nuts 23 may be tightened, thus clamping the two housings 25 and 26 between the cone 16 and the tapered head 24 of the shaft 18. To prevent the possible upsetting of the apparatus, especially when the drilling motor 36 is located toward the front end of the guiding frame 35, the latter is provided with the setting peg 37, which peg is engageable with the work for assisting in supporting the apparatus.

When the drilling operation is terminated, the drill 36 will be moved on the rear end portion of the drill guiding frame 35, and the entire apparatus wheeled away from the work without disturbing the setting of the drill guiding frame on the bars 32.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a portable drilling apparatus, the combination of a carrying frame, wheels supporting said frame, a plurality of tool supporting bars transversally of said frame and carried thereby for independent rotation around a common longitudinal axis, and means for simultaneously establishing a rigid connection between each of said bars and frame.

2. In a portable drilling apparatus, the combination of a carrying frame, wheels supporting said frame, a plurality of L shaped tool supporting elements transversally of said frame and carried thereby for rotation around a common longitudinal axis, and unitary means for establishing a rigid connection between said elements and frame.

3. In a portable drilling apparatus, the combination of a carrying frame, wheels supporting said frame, a movable element carried by said frame in longitudinal relation therewith, a plurality of tool supporting bars transversally of said frame carried by said element for rotation thereon, and means responsive to the movement of said element for simultaneously establishing a rigid connection between each of said bars and said frame.

4. In a portable drilling apparatus, the combination of a carrying frame, wheels supporting said frame, a turret like element carried by said frame for rotation on an axis longitudinally of said frame, tool supporting parallel bars carried by said turret like element for slidable movement transversally of said frame, and means for establishing a rigid connection between said bars and frame.

5. In a portable drilling apparatus, the combination of a carrying frame, wheels supporting said frame, a turret like element carried by said frame for rotation on an axis longitudinally of said frame, tool supporting bars transversally of said frame carried by said turret like element for rotation on their own axis, and means for establishing a rigid connection between said bars and frame.

6. In a portable drilling apparatus, the combination of a carrying frame including a substantially horizontal base, supporting wheels carried by said base, a duality of tool supporting parallel bars transversally of said frame carried above said base for rotation around a common axis disposed longitudinally of said frame, and means for establishing a rigid connection between said bars and frame.

7. In a portable drilling apparatus, the combination of a carrying frame, an upright rigidly connected to said frame, a shaft carried by said upright movable longitudinally of said frame, a plurality of tool supporting bars carried by said shaft for rotation around the latter, and means responsive to the longitudinal movement of said shaft for locking said bars against rotation.

LOUIS W. GREVE.